US011906943B2

United States Patent
Bruttomesso et al.

(10) Patent No.: US 11,906,943 B2
(45) Date of Patent: Feb. 20, 2024

(54) METHOD FOR AUTOMATIC TRANSLATION OF LADDER LOGIC TO A SMT-BASED MODEL CHECKER IN A NETWORK

(71) Applicant: Nozomi Networks Sagl, Mendrisio (CH)

(72) Inventors: Roberto Bruttomesso, Morazzone (IT); Alessandro Di Pinto, Malnate (IT); Moreno Carullo, Gavirate (IT); Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 172 days.

(21) Appl. No.: 17/400,947

(22) Filed: Aug. 12, 2021

(65) Prior Publication Data

US 2023/0059985 A1 Feb. 23, 2023

(51) Int. Cl.
*G05B 19/05* (2006.01)

(52) U.S. Cl.
CPC ......... *G05B 19/054* (2013.01); *G05B 19/056* (2013.01); *G05B 2219/1164* (2013.01); *G05B 2219/13018* (2013.01); *G05B 2219/13019* (2013.01); *G05B 2219/15023* (2013.01)

(58) Field of Classification Search
USPC .......................................................... 700/18
See application file for complete search history.

(56) References Cited

U.S. PATENT DOCUMENTS

| 5,812,133 A | * | 9/1998 | Schultz | G06F 11/3466 714/E11.2 |
| 2010/0169868 A1 | * | 7/2010 | Condit | G06F 8/40 717/136 |

(Continued)

*Primary Examiner* — Md Azad
(74) *Attorney, Agent, or Firm* — Jason Lee DeFrancesco

(57) ABSTRACT

The present invention relates to a method for automatic translation of ladder logic to a SMT-based model checker in a network comprising defining (10) the topology of the network as an enriched network topology based on packets exchanged in the network, extracting (20) a program from the packets relating to a PLC in the network and identifying inputs, outputs, variables and a ladder diagram of the PLC, translating (30) the inputs, outputs, variables and ladder diagram into a predefined formal model, wherein the predefined formal model is a circuit-like SMT-based model checker, and wherein the translating (30) comprises translating the set of data types of the program according to a predefined model set of data types of the circuit-like SMT-based model checker, translating the inputs of the PLC as model inputs of the circuit-like SMT-based model checker of the same type, translating the outputs of the PLC as model output latches of the circuit-like SMT-based model checker of the same type, translating the variables of the PLC as model variable latches of the circuit-like SMT-based model checker of the same type, translating comparators and arithmetic operators of the ladder diagram into a plurality of predefined model functions of the circuit-like SMT-based model checker, translating contacts and coils of the ladder diagram according to predefined model recursive procedures relating to the predefined model set of data types, the model inputs, the model output latches, the model variable latches and the plurality of predefined model functions, wherein the contacts are switches that can block or allow the flow of the current in a connection and each of the contacts is controlled by a Boolean input or variable, and wherein the coils are assignments to Boolean variables.

12 Claims, 5 Drawing Sheets

(56) References Cited

U.S. PATENT DOCUMENTS

| | | | |
|---|---|---|---|
| 2015/0277406 A1* | 10/2015 | Maturana | G06F 9/451 700/83 |
| 2016/0330222 A1* | 11/2016 | Brandt | G06N 5/047 |
| 2021/0073171 A1* | 3/2021 | Master | G06F 7/523 |
| 2022/0137586 A1* | 5/2022 | Cousineau | G05B 19/056 700/86 |
| 2023/0030253 A1* | 2/2023 | Cousineau | G05B 19/041 |

* cited by examiner

| Contacts | |
|---|---|
| Symbol | Notation |
| ⊣├ x | XIC(x) |
| ⊣/├ x | XIO(x) |

| Coils | |
|---|---|
| Symbol | Notation |
| ─◇─ y | OTE(y) |
| ─(L)─ y | OTL(y) |
| ─(U)─ y | OTU(y) |

METHOD FOR AUTOMATIC TRANSLATION OF LADDER LOGIC TO A SMT-BASED MODEL CHECKER IN A NETWORK

FIELD OF INVENTION

The present invention relates to the field of network security policy. In particular, the present invention relates to a method for automatic translation of ladder logic to a Satisfiability Modulo Theories ("SMT") based model checker in a network.

BACKGROUND ART

Even well administered networks are vulnerable to attacks due to the security ramifications of offering a variety of combined services. That is, services that are secure when offered in isolation nonetheless provide an attacker with a vulnerability to exploit when offered simultaneously.

PLCs are at the heart of modern industrial automation systems. Power plants (Dams, Nuclear, Power Grids), Oil and Gas facilities, Mines, are just a few examples of the application areas for PLCs. Being such an important part of our production chains makes them a perfect target for malicious entities that are willing to take control of or damage a site for the purpose of profit or for political and warfare reasons.

One of the easiest methods to tamper with a PLC is to inject it with malicious code, for instance a so called "Ladder Logic Bomb" (as recently defined in literature, such as in the paper "On Ladder Logic Bombs in Industrial Control System"), consisting of logic that is intended to disrupt the normal operations of a PLC by either persistently changing the behaviour, or by waiting for specific trigger signals to activate malicious behaviour. If a hacker manages to get access to an Engineering Station, he/she may load a program that, for instance, prevents stopping the production environment when the sensors are sending alarming signals. Such a scenario was in fact defined with the malware Triton discovered at a Saudi Arabian petrochemical plant in 2017, that allowed a group of hackers to block some security valves in an oil plant, causing the pipes to reach alarming level of pressure. Notice that this kind of situation may also happen for an accidental introduction of a bug by an honest employee.

It is therefore of outmost importance to provide a Security Manager with automated tools that would help in detecting if any anomalous program is uploaded to a PLC.

Translation of PLC programs into formal models has been extensively studied in the past years, having the scope of reductions to timed automata for the UPPAAL tool, reductions to Computational Tree Logic ("CTL") model checking for Symbolic Model Verifier ("SMV"), or reductions to other model checkers, wherein much of the emphasis on the previous works is put on the encoding of the timer blocks, and the translation is oftentimes described in terms of automata diagrams, or CTL formulas.

A model-checker is employed to automatically discover violation of properties that are supposed to hold on the system at any point in time. Counterexamples can be derived from the property violations and translated back to real input values for the original system.

There is, therefore, the need to ensure that accurate translation of ladder logic to a SMT-based model checker is generated.

BRIEF DESCRIPTION OF THE INVENTION

The object of the present invention is to provide a method capable of generate in a most accurate way translation of ladder logic to a SMT-based model checker.

According to the present invention is described, therefore, a method for automatic translation of ladder logic to a SMT-based model checker in a network.

The method for automatic translation of ladder logic to a SMT-based model checker in a network comprises:
  defining the topology of the network as an enriched network topology based on packets exchanged in the network;
  extracting a program from the packets relating to a PLC in the network and identifying inputs, outputs, variables and a ladder diagram of the PLC;
  translating the inputs, outputs, variables and ladder diagram into a predefined formal model;
wherein the predefined formal model is a circuit-like SMT-based model checker; and
wherein the translating comprises:
  translating the set of data types of the program according to a predefined model set of data types of the circuit-like SMT-based model checker;
  translating the inputs of the PLC as model inputs of the circuit-like SMT-based model checker of the same type;
  translating the outputs of the PLC as model output latches of the circuit-like SMT-based model checker of the same type;
  translating the variables of the PLC as model variable latches of the circuit-like SMT-based model checker of the same type;
  translating comparators and arithmetic operators of the ladder diagram into a plurality of predefined model functions of the circuit-like SMT-based model checker;
  translating contacts and coils of the ladder diagram according to predefined model recursive procedures relating to the predefined model set of data types, the model inputs, the model output latches, the model variable latches and the plurality of predefined model functions, wherein the contacts are switches that can block or allow the flow of the current in a connection and each of the contacts is controlled by a Boolean input or variable, and wherein the coils are assignments to Boolean variables.

In a further embodiment, the predefined model set of data types comprises the data types 1-bit Boolean, 8-bits signed integers, 16-bits signed integers, 32-bits signed integers, 64-bits signed integers, 8-bits unsigned integers, 16-bits unsigned integers, 32-bits unsigned integers, 64-bits unsigned integers, 32-bits single-precision floating point and 64-bits double-precision floating point.

In a further embodiment, the program is a Rockwell L5X file format,
wherein the set of data types of the program comprises the data types 1-bit Boolean, 8-bits signed integers, 16-bits signed integers, 32-bits signed integers, 64-bits signed integers, 8-bits unsigned integers, 16-bits unsigned integers, 32-bits unsigned integers, 64-bits unsigned integers, 32-bits single-precision floating point, 64-bits double-precision floating point and a variable-size array of 8-bits signed integers, and
wherein the predefined model set of data types is matched with the corresponding set of data types by removing the data type of variable-size array of 8-bits signed integers.

In a further embodiment, the set of data types of the program has the notation BOOL for the 1-bit Boolean, SINT for the 8-bits signed integers, INT for the 16-bits signed integers, DINT for the 32-bits signed integers, LINT for the 64-bits signed integers, USINT for the 8-bits unsigned integers, UINT for the 16-bits unsigned integers, UDINT for the 32-bits unsigned integers, ULINT for the 64-bits unsigned integers, REAL for the 32-bits single-precision floating point and LREAL for the 64-bits double-precision floating point, and wherein the predefined model set of data types is matched with the corresponding set of data types having the notation Boolean for the 1-bit Boolean, int8 for the 8-bits signed integers, int16 for the 16-bits signed integers, int32 for the 32-bits signed integers, int64 for the 64-bits signed integers, usint8 for the 8-bits unsigned integers, uint16 for the 16-bits unsigned integers, uint32 for the 32-bits unsigned integers, uint64 for the 64-bits unsigned integers, float32 for the 32-bits single-precision floating point and float64 for the 64-bits double-precision floating point.

In a further embodiment, the predefined model functions comprise the functions Addition, Subtraction, Multiplication, Division, Modulo, Negate, Absolute value, Limit, Equal to, Less than, Greater than, Less than or equal to and Greater than or equal to.

In a further embodiment, the program is a Rockwell L5X file format, wherein the comparators and arithmetic operators of the program have the notation ADD(a,b,c) for the Addition, SUB(a,b,c) for the Subtraction, MUL(a,b,c) for the Multiplication, DIV(a,b,c) for the Division, MOD(a,b,c) for the Modulo, NEG(a,b) for the Negate, ABS(a,b) for the Absolute value, LIM(−10,a,10) for the Limit, EQU(a,b) for the Equal to, LES(a,b) for the Less than, GRT(a,b) for the Greater than, LEQ(a,b) for the Less than or equal to and GEQ(a,b) for the Greater than or equal to, and wherein the predefined model functions are matched with the corresponding comparators and arithmetic operators following the construction c=ctx.mk_add(a, b) for the Addition, c=ctx.mk_sub(a, b) for the Subtraction, c=ctx.mk_mul(a, b) for the Multiplication, c=ctx.mk_div(a, b) for the Division, c=ctx.mk_mod(a, b) for the Modulo, b=ctx.mk_minus(a) for the Negate, b=ctx.mk_ite(ctx.mk_lt(a, ctx.mkNumber("0", it)), ctx.mk_minus(a), a) for the Absolute value, ctx.mk_and (ctx.mk_geq(a, ctx.mkNumber("−10", it)), ctx.mk_leq(a, ctx.mkNumber("10", it))) for the Limit, ctx.mk_eq(a, b) for the Equal to, ctx.mk_lt(a, b) for the Less than, ctx.mk_gt(a, b) for the Greater than, ctx.mk_leq(a, b) for the Less than or equal to and ctx.mk_geq(a, b) for the Greater than or equal to.

In a further embodiment, the predefined model recursive procedures comprise a first contacts translating procedure and a second contacts translating procedure which allow to translate contacts and a first coils translating procedure, a second coils translating procedure and a third coils translating procedure which allow to translate coils, wherein the first contacts translating procedure returns the model input or the currently stored of the model output latch or model variable latch and the second contacts translating procedure returns the negate of the model input or the negate currently stored of the model output latch or model variable latch, and wherein the first coils translating procedure assigns the value received from the left connection, the second coils translating procedure sets the latch value to true if the left connection holds true otherwise preserves the previous value and the third coils translating procedure sets the latch value to false if the left connection holds false otherwise preserves the previous value.

In a further embodiment, the program is a Rockwell L5X file format, wherein the contacts of the program comprise the notation XIC(x) to examine if the switch is closed, which propagates 1 only if the value on the left is 1 and x is 1, and XIO(x) to examine if the switch is open, which propagates 1 only if the value on the left is 1 and x is 0, wherein the first contacts translating procedure matches with the notation XIC(x) following the construction
    Procedure TranslateXIC(element)
        if element "is not input":
            element=var2current[element]
        return element,
wherein the second contacts translating procedure matches with the notation XIO(x) following the construction
    Procedure TranslateXIO(element)
        if element "is not input":
            element=var2current[element]
        return ctx.mk_not(element), and
wherein the coils of the program comprise the notation OTE(y) to energy output, which assigns 1 to y if the value on the left is 1 otherwise 0, OTL(y) to latch output, which assigns 1 to y if the value on the left is 1 otherwise leave unchanged, and OTU(y) to unlatch output, which assigns 0 to y if the value on the left is 1 otherwise leave unchanged, wherein the first coils translating procedure matches with the notation OTE(y) following the construction
    Procedure TranslateOTE(element)
        var2current[element]=element2precondition[element]
        return var2current[element]
wherein the second coils translating procedure matches with the notation OTL(y) following the construction
    Procedure TranslateOTL(element)
        var2current[element]=ctx.mk_or(var2current[element], element2precondition[element])
        return var2current[element], and
wherein the third coils translating procedure matches with the notation OTU(y) following the construction
    Procedure TranslateOTU(element)
        var2current[element]=ctx.mk_and(ctx.mk_not (element2precondition[element]), var2current[element])
        return var2current[element].

In a further embodiment, the circuit-like SMT-based model checker defines a circuit with a global clock that divides the execution into discrete time steps.

In a further embodiment, the circuit-like SMT-based model checker comprises:
- model inputs as basic signals of any supported type that get a new value at every time step;
- model output latches and model variable latches as basic memory elements that can hold a value of a supported type;
- Boolean gates;
- predefined model functions as comparators and arithmetic operators;
- constants as signal values of any supported type that never change value at every of the time steps.

In a further embodiment, the model output latches and model variable latches store an initial value and a next state function they hold when the circuit is booted at first time step.

In a further embodiment, the model output latches and model variable latches are updated with a new value at each subsequent time step by the value expressed by the next state function.

DESCRIPTION OF THE FIGURES

These and further features and advantages of the present invention will become apparent from the disclosure of the preferred embodiments, illustrated by way of a non-limiting example in the accompanying figures, wherein.

DETAILED DESCRIPTION OF THE INVENTION

Figure 1:
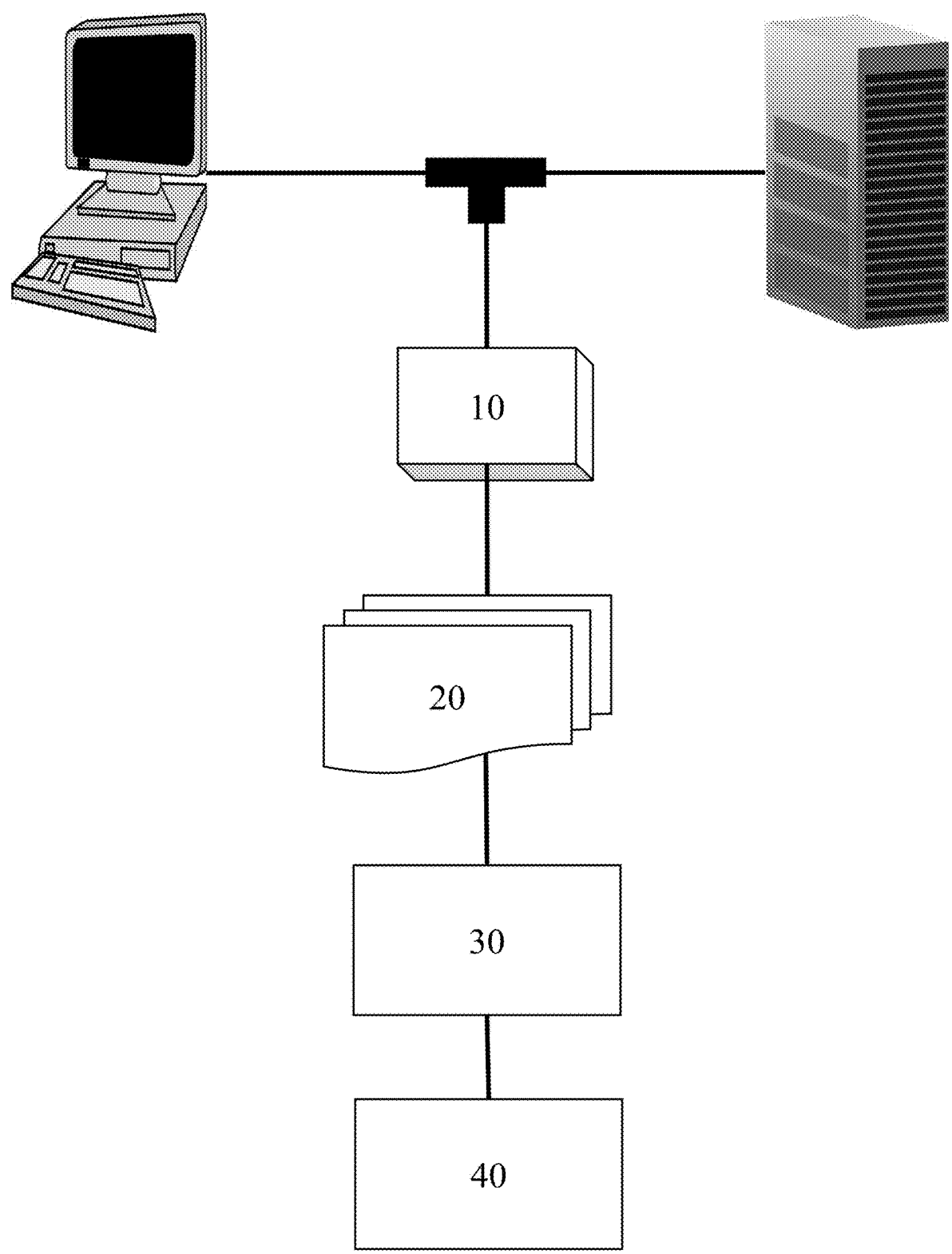
FIG. 1 shows a block diagram according to an embodiment of the present invention.

The present invention relates to a method for automatic method for automatic translation of ladder logic to a SMT-based model checker in a network.

The method according to the present invention finds a useful application in any kind of physical infrastructures or automation systems connected in a network, in particular in industrial automation systems, such as industrial processes for manufacturing production, industrial processes for power generation, infrastructures for distribution of fluids (water, oil and gas), infrastructures for the generation and/or transmission of electric power, infrastructures for transport management. Moreover, it finds useful application with all the technology environments, including Information Technology (IT), Operation Technology (OT) and Internet of Things (IoT).

The term "network protocol" means, in the present invention, a system of rules between entities on a network, describing how the bytes composing the message to exchange should be structured for the entities to understand each other. Noteworthy examples of network protocols are TCP/IP, Modbus, BACnet.

The term "packet" means, in the present invention, a finite sequence of bytes that represents a message exchanged between the entities on a network, in particular between two nodes. Each protocol defines a particular structure for the set of valid packets that could be exchanged, and it defines the rules that govern a sensible communication.

The term "node" means, in the present invention, a device in the network that can receive and/or transmit data through a connection, being it based on a cable or a radio signal. A node is identified with a unique identifier, which could be for instance a MAC address or an IP address.

The term "link" means, in the present invention, a physical or radio connection between two nodes of the network that allow the transmission of packets in both directions.

The term "edge" means, in the present invention, a direct communication of nodes $n_1$ and $n_2$ in the network via protocol p, which could have for instance a notation $(n_1, p, n_2)$. There might be several edges between two nodes, one per each communication protocol used.

The term "network topology graph" means, in the present invention, an abstraction of the structure of a network, and it can be represented as a Labelled Graph G(N,E,P), where N is the set of nodes, and E is the set of edges, P is the set of protocols such that each edge is a tuple $(n_1, p, n_2)$ where $n_1, n_2 \in N$, $n_1 \neq n_2$, $p \in P$. The edges define the nodes that are connected, and the edge is interpreted as having a direction, i.e., in (x, y) x is the source node and y is the destination node. A labelled directed graph is a graph G=(N, E, L) where L is a set of labels and E={(x, y, l)|(x, y, l)∈N×N×L}. Essentially each edge in the graph is decorated with a label in L.

The term "deep packet inspection" or "DPI" means, in the present invention, a technique that consists in listening to the network traffic (sniffing) and inspecting the captured packets to derive properties of the network. For instance, the information about the source and the destination of a sufficiently large number of packets may be exploited to build the network topology graph.

The term "formal model" or "formal method" means, in the present invention, a set of techniques that approach the solution of a problem by recasting it into an equivalent one but expressed in a formal language, or "formal model", for instance a set of mathematical or logical expressions. These expressions can then be solved by an automated tool, and the solution can be translated back into a solution in the original problem. One of the most prominent techniques is Model Checking, where the problem is translated into a finite state automaton. Model Checking is successfully employed in industrial settings for determining the safety of hardware and software by a model checker.

The term "model checking" means, in the present invention, a technique in Formal Methods, where the problem at hand is translated into a finite state automaton and then analyzed with automated search techniques. Model Checking is successfully employed in several industrial settings for determining the safety of hardware and software. SMT Model Checking refers to the use of SMT-solvers as back-ends for implementing a model checker. An example of SMT Model Checker is the tool Intrepid.

The term "PLC" means, in the present invention, a Programmable Logic Controller (PLC) which is an industrial computer system that continuously monitors the state of input devices and makes decisions based on a custom program to control the state of output devices. PLCs are widely used in industrial control systems (ICS) for handling sensors and actuators, mainly because of their robust nature and ability to withstand harsh conditions including severe heat, cold, dust, and extreme moisture.

The term "IEC-61131-3" means, in the present invention, an international standard for PLCs. The part 3 of the standard defines the characteristics of the programming languages that should be used to program a PLC. It defines two textual languages, Structured Text (ST) and Instruction List (IL), and three graphical languages Function Block Diagram (FBD), Ladder Diagram (LD), and Sequential Function Chart (SFC). The languages, despite being quite different in syntax, are all equivalent from a semantical point of view (they can write the same set of programs). The standard is essentially implemented by all the major vendors, even though each proposes its custom environment for developing programs and operating with the PLCs.

The term "Rockwell's L5X file format" means, in the present invention, a file format from Rockwell Automation which is one of the major PLC vendors.

The term "PLC Bomb" or "Ladder Bomb" means, in the present invention, to a PLC program written in Ladder Diagram whose goal is to cause harm to the PLC or the machinery it controls and it includes malicious programs written in any of the other languages defined by the IEC-61131-3 standard.

The term "Engineering Station" means, in the present invention, a computer that runs a software that can be used to program a PLC or run other configuration and diagnostic tools. The program for the PLC is written and saved locally on the Engineering Station and eventually it is uploaded to the internal memory of the PLC using a network connection.

The method for automatic method for automatic translation of ladder logic to a SMT-based model checker in a network according to the present invention is herewith described with reference to figures FIG. 1, which shows a block diagram according to an embodiment of the present invention. FIGS. 2-5 show examples blocks of symbols in a Ladder Diagram (or Ladder Logic) and their combination, while FIG. 6 shows a block of schematic circuit representations in an Intrepid Model.

A Ladder Diagram is a graphical representation language for PLC programs that resembles electromechanical relay systems, describing a program in terms of the power flow. The name is based on the observation that programs in this language resemble ladders, with two vertical rails and a series of horizontal rungs between them, therefore power rails are connected by horizontal lines, that remind the rungs of a ladder. Each rung is to be interpreted as an instruction of the program. Multiple rungs are executed in order, from the top to the bottom, unless otherwise specified by the user by means of specific instructions.

Ladder Diagrams as specified by the IEC-61131-3 standard do not come with a specific input language, rather they are described in terms of visual diagrams. A Ladder Diagram is bounded by two power rails, on the left and on the right, depicted as vertical lines. The left rail is assumed to be connected to +5 Vcc, or to hold the logical state 1, while the right rail can be understood as being connected to the ground, or to hold logical state 0.

A rung can be programmed by means of connections, contacts, coils, calls to functions, function blocks and control flow statements. The language therefore can be seen as a set of connections between logical checkers, called contacts, and actuators, called coils. If a path can be traced between the left side of the rung and the output, through asserted contacts, the rung is true and the output coil storage bit is asserted 1 or true. If no path can be traced, then the output is false 0 and the coil by analogy to electromechanical relays is considered de-energized. Each rung of ladder language typically has one coil at the far right. Some manufacturers may allow more than one output coil on a rung.

In the present application we focus on Rockwell's Ladder Logic programs, in particular, with reference to L5X file format, but all consideration may be adapted to any Ladder Logic program in particular for those complying with the IEC-61131-3 standard.

The set of data types of the program that are supported by Rockwell's PLCs comprises the data types 1-bit Boolean, 8-bits signed integers, 16-bits signed integers, 32-bits signed integers, 64-bits signed integers, 8-bits unsigned, 16-bits unsigned integers, 32-bits unsigned integers, 64-bits unsigned integers, 32-bits single-precision floating point, 64-bits double-precision floating point and a variable-size array of 8-bits signed integers. The notation of each data type follows the scheme below:
BOOL: 1 bit
SINT: 8 bits signed integers
INT: 16 bits signed integers
DINT: 32 bits signed integers
LINT: 64 bits signed integers
USINT: 8 bits unsigned integers
UINT: 16 bits unsigned integers
UDINT: 32 bits unsigned integers
ULINT: 64 bits unsigned integers
REAL: 32 bits single-precision floating point
LREAL: 64 bits double-precision floating point
STRING: variable-size array of SINT, each representing an ASCII character Each PLC comes with a particular set of inputs and outputs, that may vary in name, number, and data type. Local variables can be defined by the user and are subjected to the PLC's available memory.

Connections are horizontal or vertical lines that can be used to propagate the signals in a rung. A simple horizontal connection propagates the signal on the left to the right. A vertical connection can be used to split the signal in two or more sub-rungs, and to rejoin them before reaching the right power line. Every element of the ladder diagram is attached to a rung by means of a connection.

Figures 2, 3:
FIG. 2 shows a block of symbols relating to Contacts and Coils in a Ladder Diagram.
FIG. 3 shows a diagram with combination of Connections and Contacts that store a value in a Coil in a Ladder Diagram.

Contacts, as input of a rung, may refer to physical inputs to the programmable controller from physical devices such as pushbuttons and limit switches via an integrated or external input module, or may represent the status of internal storage bits which may be generated elsewhere in the program. In the Ladder Program, Contacts, or checkers, are part of the rung input defined by switches that can block or allow the flow of the current in a connection, in particular they make or break circuits to control coils. A contact is controlled by a BOOL input or variable. FIG. 2 shows a block of symbols relating to Contacts in a Ladder Diagram grouped in the related table. In particular, with the notation XIC(x) is indicated the contact symbol relating to the examination if the contact is closed, while with the notation XIO(x) is indicated the contact symbol relating to the examination if the contact is open. Therefore, XIC(x) propagates 1 if and only if the value on the left is 1 and x is 1, while XIO(x) propagates 1 if and only if the value on the left is 1 and x is 0.

Coils, as output of a rung, may represent physical outputs which operate some devices connected to the programmable controller, or may represent internal storage bits for use elsewhere in the program, and are assignments to BOOL variables. FIG. 2 shows a block of symbols relating to Coils in a Ladder Diagram grouped in the related table. In particular, with the notation OTE(y) is indicated the coil symbol relating to the output energize, with the notation OTL(y) is indicated the coil symbol relating to the output latch, while with the notation OTU(y) is indicated the coil symbol relating to the output unlatch. Therefore, OTE(y) assigns 1 to y if the value on the left is 1 otherwise assigns 0, OTL(y) assigns 1 to y if the value on the left is 1 otherwise leave unchanged, while OTU(y) assigns 0 to y if the value on the left is 1 otherwise leave unchanged.

Each contact or coil corresponds to the status of a single bit in the programmable controller's memory. Unlike electromechanical relays, a ladder program can refer any number of times to the status of a single bit, equivalent to a relay with an indefinitely large number of contacts. Using connections, contacts, and coils it is possible to create arbitrarily complex state machines that can be used to energize other blocks. In this regard, FIG. 3 shows a Ladder diagram with combination of Connections and Contacts that store a value in a Coil. The corresponding Rockwell notation for the aforementioned diagram is XIC(x)[XIC(w)XIO(t),XIC(v)] OTE(y), which can be interpreted as the Boolean assignment $y := x \wedge ((w \wedge \neg t) \vee v)$.

Figure 4:
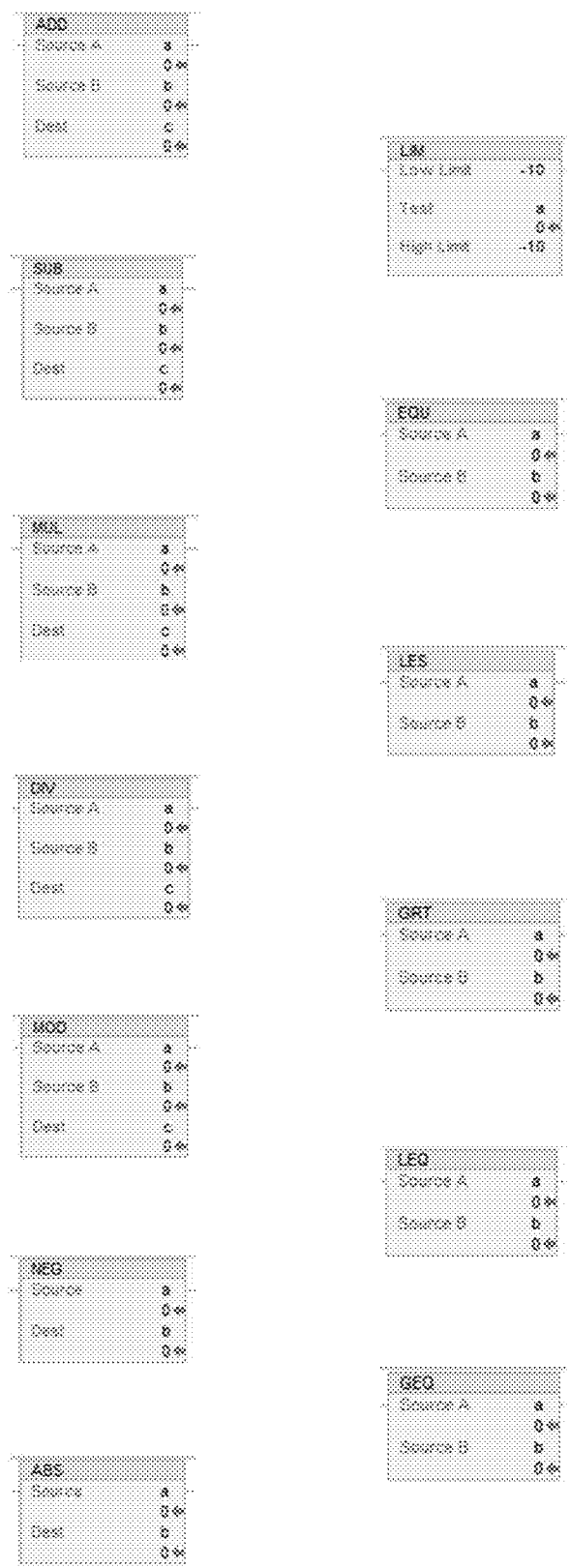
FIG. 4 shows a block of symbols relating to Functions in a Ladder Diagram.

Functions (standard or user-defined) may operate on all the available data types. The input connection from the left specifies whether the intended operation must be executed or not. The output connection to the right might be either a propagation of the value of the input connection (e.g., for adders, subtractors, . . . ) or it holds the BOOL result of an operation between two values. FIG. 4 shows a block of symbols relating to Functions, which are comparators and arithmetic operators of the program, in a Ladder Diagram, as considered in the present application. In particular, with the notation ADD(a,b,c) is indicated the function relating to the Addition, with the notation SUB(a,b,c) is indicated the function relating to the Subtraction, with the notation MUL(a,b,c) is indicate the function relating to Multiplication, with the notation DIV(a,b,c) is indicated the function relating to Division, with the notation MOD(a,b,c) is indicated the function relating to Modulo, with the notation NEG(a,b) is indicated the function relating to Negate, with the notation ABS(a,b) is indicated the function relating to Absolute Value, with the notation LIM(−10,a,10) is indicated the function relating to Limit, with the notation EQU(a,b) is indicated the function relating to Equal to, with the notation LES(a,b) is indicated the function relating to Less than, with the notation GRT(a,b) is indicated the function relating to Greater than, with the notation LEQ(a,b) is indicated the function relating to Less than or equal to, while with the notation GEQ(a,b) is indicated the function relating to Greater than or equal to. Therefore, ADD(a,b,c) defines c:=a+b if the value on the left is 1, the value on the right being the same as the value on the left, SUB(a,b,c) defines c:=a−b if the value on the left is 1, the value on the right being the same as the value on the left, MUL(a,b,c) defines c:=a*b if the value on the left is 1, the value on the right being the same as the value on the left, DIV(a,b,c) defines c:=a/b if the value on the left is 1, the value on the right being the same as the value on the left, MOD(a,b,c) defines c:=a % b if the value on the left is 1, the value on the right being the same as the value on the left, NEG(a,b) defines b:=−a if the value on the left is 1, the value on the right being the same as the value on the left, ABS(a,b) defines b:=|a| if the value on the left is 1, the value on the right being the same as the value on the left, LIM(−10,a,10) assigns 1 to the value on the right if the value on the left is 1 and −10≤a≤10 holds, assign 0 otherwise, EQU(a.b) assigns 1 to the value on the right if the value on the left is 1 and a=b holds, assign 0 otherwise, LES(a,b) assigns 1 to the value on the right if the value on the left is 1 and a<b holds, assign 0 otherwise, GRT(a,b) assigns 1 to the value on the right if the value on the left is 1 and a>b holds, assign 0 otherwise, LEQ(a,b) assigns 1 to the value on the right if the value on the left is 1 and a≤b holds, assign 0 otherwise, while GEQ(a,b) assigns 1 to the value on the right if the value on the left is 1 and a≥b holds, assign 0 otherwise.

Figure 5:
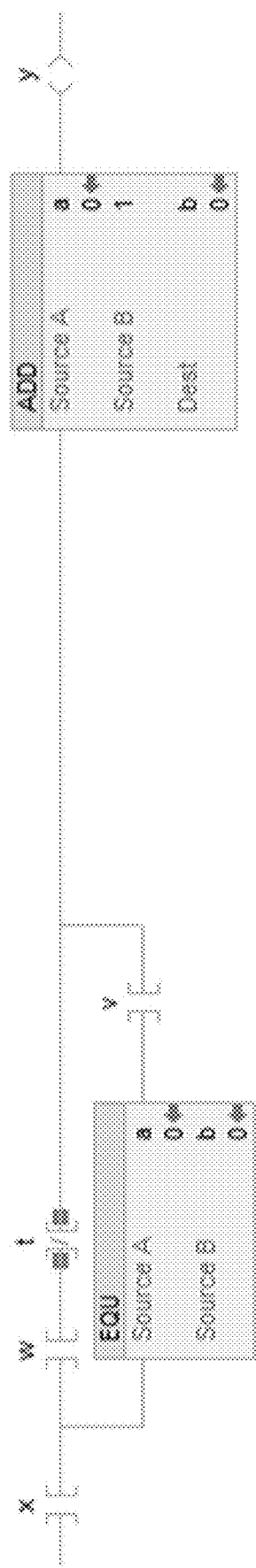
FIG. 5 shows the diagram of FIG. 3 enriched with some Functions of FIG. 4.
Figure 6:
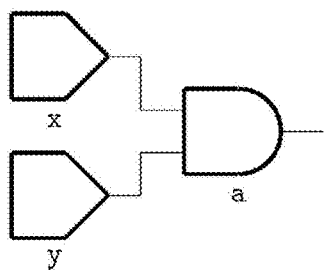
FIG. 6 shows a block of schematic circuit representations in an Intrepid Model.
Figure 6:
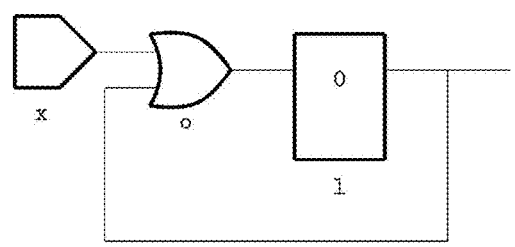
Figure 6:
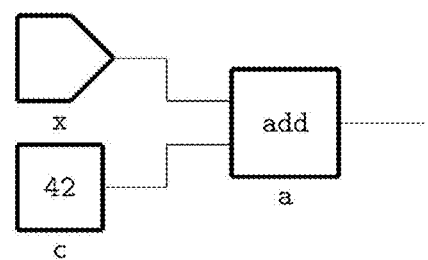
Figure 6:
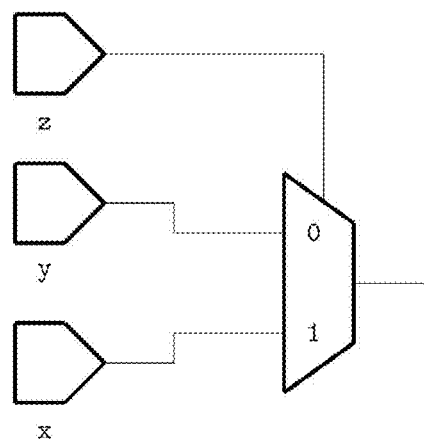

In this regard, FIG. 5 shows the diagram of FIG. 3 enriched with some standard Functions of FIG. 4, as above described. The corresponding Rockwell notation for the diagram is XIC(x)[XIC(w)XIO(t),EQU(a,b)XIC(v)]ADD(a,1,b)OTE(y), which can be interpreted as the Boolean assignment y:=x∧((w∧¬t)∨((a=b)∧v). Also, the ADD function is executed only when the precondition x∧((w∧¬t)∨((a=b)∧v) holds true.

With regard to function blocks and control flow statements in the present application they will not be considered for modelling, but they can be covered in further embodiments according to the present invention even if not herewith described.

In the present application a method to translates a Ladder program into a circuit-like formal machine like the one used by the Intrepid model checker is described. Once the Ladder program is translated into such language it is possible to automatically analyze the program in seek of desired properties (e.g., that a certain condition that triggers a bad behavior can never hold true). The present invention can be preferably used on industrial computer networks consisting of many connected nodes, and, most notably, contains Engineering Stations and PLCs. The Engineering Stations execute a "Program Upload" action from time to time, with the goal of updating the program of the connected PLCs. The other portion of the network is irrelevant as far as this invention is concerned, and it can contain a larger number of other nodes, sensors, and actuators. The present invention may also be applied to any other device that may be loaded with a program from another computer and that are not commonly categorized as PLCs (e.g., smart devices, IoT devices, general-purpose micro-computers such as Raspberry Pis).

According to the present invention is described, therefore, a method for automatic translation of ladder logic to a SMT-based model checker in a network.

The method for automatic translation of ladder logic to a SMT-based model checker in a network comprises:
defining the topology of the network as an enriched network topology based on packets exchanged in the network;
extracting a program from the packets relating to a PLC in the network and identifying inputs, outputs, variables and a ladder diagram of the PLC;
translating the inputs, outputs, variables and ladder diagram into a predefined formal model.

The method therefore comprises defining the topology of the network as an enriched network topology based on packets exchanged in the network, as illustrated in the block 10 of FIG. 1. The computer network is augmented with a sniffing device that can perform Deep Packet Inspection.

Afterwards, the method comprises extracting a program from the packets relating to a PLC in the network and identifying inputs, outputs, variables and a ladder diagram of the PLC, as illustrated in the block 20 of FIG. 1. It is assumed that a procedure is in place that can extract the program from the packets that transit from the Engineering Stations and the PLCs. The complexity of extracting a program from the traffic may range from the "very easy" to the "essentially impossible": there are vendors that transmit the source code of the program in clear text, others that transmit the program encrypted, others that do not transmit the source code at all, others only send the compiled binary code. As far as this application is concerned, we assume that we are in the scenario where the source code is available or that a sufficiently powerful reverse engineering procedure is in place that allows for the retrieval and reconstruction of the PLC program.

Finally, the method comprises translating the inputs, outputs, variables and ladder diagram into a predefined formal model, as illustrated in the block 30 of FIG. 1 The obtained PLC program is parsed, and it is translated into a predefined formal model, wherein the predefined formal model is a circuit-like SMT-based model checker.

Once the translation has been performed a user may query 40 the SMT-based model checker to figure out the conditions for the reachability of a particular condition of the program. For example, the user may query the checker for the condition that would trigger a subroutine calling itself, or an out-of-bound access to an array.

A preferred SMT-based Model Checker is the Intrepid Model, to which the embodiment of the present application is based. Intrepid is a freely available SMT Model Checker that comes in the form of a python library. The input models for Intrepid are essentially python scripts that use the tool's APIs.

In an embodiment, such a circuit-like SMT-based model checker defines a circuit with a global clock that divides the execution into discrete time steps.

In an embodiment, the circuit-like SMT-based model checker comprises:
- model inputs as basic signals of any supported type that get a new value at every time step;
- model output latches and model variable latches as basic memory elements that can hold a value of a supported type;
- Boolean gates;
- predefined model functions as comparators and arithmetic operators;
- constants as signal values of any supported type that never change value at every of said time steps.

The translating 30 may comprise translating the set of data types of the program according to a predefined model set of data types of the circuit-like SMT-based model checker. In the embodiment herewith described, the predefined model set of data types comprises the data types 1-bit Boolean, 8-bits signed integers, 16-bits signed integers, 32-bits signed integers, 64-bits signed integers, 8-bits unsigned integers, 16-bits unsigned integers, 32-bits unsigned integers, 64-bits unsigned integers, 32-bits single-precision floating point and 64-bits double-precision floating point.

According to the Rockwell L5X file format and the set of data types already described, in translating the set of data types of the program according to a predefined model set of data types of the circuit-like SMT-based model checker the predefined model set of data types is matched with the corresponding set of data types by removing the data type of variable-size array of 8-bits signed integers. In particular, according to the notation of the set of data types of the program already described, the predefined model set of data types is matched with the corresponding set of data types having the notation Boolean for the 1-bit Boolean, int8 for the 8-bits signed integers, int16 for the 16-bits signed integers, int32 for the 32-bits signed integers, int64 for the 64-bits signed integers, uint8 for the 8-bits unsigned integers, uint16 for the 16-bits unsigned integers, uint32 for the 32-bits unsigned integers, uint64 for the 64-bits unsigned integers, float32 for the 32-bits single-precision floating point and float64 for the 64-bits double-precision floating point.

The translating 30 may further comprise translating the inputs of the PLC as model inputs of the circuit-like SMT-based model checker of the same type. With regard to the Intrepid model checker language inputs are basic signals of any supported type. If the execution of the model checker is divided into discrete time steps, at every time step the input is assumed to get a new value.

The translating 30 may comprise translating the outputs of the PLC as model output latches of the circuit-like SMT-based model checker of the same type. Moreover, translating 30 comprises translating the variables of the PLC as model variable latches of the circuit-like SMT-based model checker of the same type. With regard to the Intrepid model checker language latches are memory elements that can hold a value of a supported type. Preferably, the model output latches and model variable latches store an initial value and a next state function they hold when the circuit is booted at first time step. If the execution of the model checker is divided into discrete time steps, the model output latches and model variable latches are updated with a new value at each subsequent time step by the value expressed by the next state function.

The Intrepid model checker language comprises constants, which are signal values of any supported type that never change, arithmetic and comparison elements and Boolean gates, which found useful application in the translation of the further elements as below described in greater detail.

In fact, translating 30 may comprise translating the comparators and arithmetic operators of the ladder diagram into a plurality of predefined model functions of the circuit-like SMT-based model checker. In the embodiment herewith described, the predefined model functions comprise the functions Addition, Subtraction, Multiplication, Division, Modulo, Negate, Absolute value, Limit, Equal to, Less than, Greater than, Less than or equal to and Greater than or equal to. In this regard, FIG. 4 shows a block of symbols relating to Functions in a Ladder Diagram.

According to the Rockwell L5X file format and the comparators and arithmetic operators of the program already described, the predefined model functions are matched with the corresponding comparators and arithmetic operators. The below construction is followed: c=ctx.mk_add(a, b) for the Addition, c=ctx.mk_sub(a, b) for the Subtraction, c=ctx.mk_mul(a, b) for the Multiplication, c=ctx.mk_div(a, b) for the Division, c=ctx.mk_mod(a, b) for the Modulo, b=ctx.mk_minus(a) for the Negate, b=ctx.mk_ite(ctx.mk_lt (a, ctx.mkNumber("0", it)), ctx.mk_minus(a), a) for the Absolute value, ctx.mk_and(ctx.mk_geq(a, ctx.mkNumber ("−10", it)), ctx.mk_leq(a, ctx.mkNumber("10", it))) for the Limit, ctx.mk_eq(a, b) for the Equal to, ctx.mk_lt(a, b) for the Less than, ctx.mk_gt(a, b) for the Greater than, ctx.mk_leq(a, b) for the Less than or equal to and ctx.mk_geq(a, b) for the Greater than or equal to.

In particular, according to the notation of the comparators and arithmetic operators of the program already described, the predefined model functions are matched with the corresponding comparators and arithmetic operators having the notation ADD(a,b,c) for the Addition, SUB(a,b,c) for the Subtraction, MUL(a,b,c) for the Multiplication, DIV(a,b,c) for the Division, MOD(a,b,c) for the Modulo, Neg(a,b) for the Negate, ABS(a,b) for the Absolute value, LIM(−10,a,10) for the Limit, EQU(a,b) for the Equal to, LES(a,b) for the Less than, GRT(a,b) for the Greater than, LEQ(a,b) for the Less than or equal to and GEQ(a,b) for the Greater than or equal to.

Finally, translating 30 may comprises translating contacts and coils of the ladder diagram according to predefined model recursive procedures relating to the predefined model set of data types, the model inputs, the model output latches, the model variable latches and the plurality of predefined model functions, wherein the contacts are switches that can block or allow the flow of the current in a connection and each of the contacts is controlled by a Boolean input or variable, and wherein the coils are assignments to Boolean variables.

In an embodiment, the predefined model recursive procedures comprise a first contacts translating procedure and a second contacts translating procedure which allow to translate contacts and a first coils translating procedure, a second coils translating procedure and a third coils translating procedure which allow to translate coils. The first contacts translating procedure returns the model input or the currently stored of the model output latch or model variable latch and the second contacts translating procedure returns the negate of the model input or the negate currently stored of the model output latch or model variable latch, and wherein the first coils translating procedure assigns the value received from the left connection, the second coils translating procedure sets the latch value to true if the left connection holds true otherwise preserves the previous value and the third coils translating procedure sets the latch value to false if the left connection holds false otherwise preserves the previous value.

According to the Rockwell L5X file format and the contacts and coils of the ladder diagram, as illustrated in FIGS. 2 and 3, the contacts of the program comprise the notation XIC(x) to examine if the switch is closed, which propagates 1 only if the value on the left is 1 and x is 1, and XIO(x) to examine if the switch is open, which propagates 1 only if the value on the left is 1 and x is 0. The first contacts translating procedure matches with the notation XIC(x) following the construction Procedure TranslateXIC(element)
        if element "is not input":
            element=var2current[element]
        return element, The second contacts translating procedure matches with the notation XIO(x) following the construction Procedure TranslateXIO(element)
        if element "is not input":
            element=var2current[element]
        return ctx.mk_not(element), and The coils of the program comprise the notation OTE(y) to energy output, which assigns 1 to y if the value on the left is 1 otherwise 0, OTL(y) to latch output, which assigns 1 to y if the value on the left is 1 otherwise leave unchanged, and OTU(y) to unlatch output, which assigns 0 to y if the value on the left is 1 otherwise leave unchanged.

The first coils translating procedure matches with the notation OTE(y) following the construction Procedure TranslateOTE(element)
        var2current[element]=element2precondition[element]
        return var2current[element]

The second coils translating procedure matches with the notation OTL(y) following the construction Procedure TranslateOTL(element)
        var2current[element]=ctx.mk_or(var2current[element], element2precondition[element])
        return var2current[element], and The third coils translating procedure matches with the notation OTU(y) following the construction Procedure TranslateOTU(element)
        var2current[element]=ctx.mk_and(ctx.mk_not(element2precondition[element]), var2current[element])
        return var2current[element].

FIG. 6 shows a block of schematic circuit representations in an Intrepid Model. The first representation relates to an AND of two inputs, wherein the Intrepid model is written as:

ctx=Context( )
        bt=ctx.mk_boolean_type( )
        x=ctx.mk_input("x", bt)
        y=ctx.mk_input("y", bt)
        a=ctx.mk_and(x, y)

The second representation relates to a latch, initialized at 0 and receiving the OR of its previous value and an input, wherein the Intrepid model is written as:

ctx=Context( )
        bt=ctx.mk_boolean_type( )
        x=ctx.mk_input("x", bt)
        1=ctx.mk_latch("1", bt)
        o=ctx.mk_or(x, 1)
        ctx.set_latch_init_next(1,
            ctx.mk_false( )
            o)

The third representation relates to an addition of an input by a constant value, wherein the Intrepid model is written as:

ctx=Context( )
        it=ctx.mk_int32_type( )
        x=ctx.mk_input("x", it)
        c=ctx.mk_number("42", it)
        a=ctx.mk_add(x, c)

The fourth representation relates to an if-then-else, wherein the Intrepid model is written as:

ctx=Context( )
        it=ctx.mk_int32_type( )
        bt=ctx.mk_boolean_type( )
        x=ctx.mk_input("x", it)
        y=ctx.mk_input("y", it)
        z=ctx.mk_input("z", bt)
        i=ctx.mk_ite(z, x, y)

The translation of a network from the Rockwell notation to Intrepid can be better understood with an embodiment of the predefined model recursive procedures from the table below reported, described in greater details as follows, according to an embodiment of the present invention.

```
1    element2latch = { }
2    element2precondition = { }
3    var2current = { }
4    ctx = intrepyd.Context( )
5
6
7    Procedure Rockwell2Intrepid(rungs, inputs, outputs, variables):
8        for out in outputs + variables:
9            CreateLatch(i)
10       for rung in rungs:
11           TranslateRung(rung)
12       for out in outputs + variables:
13           FinalizeLatch(i)
14
15
16   Procedure TranslateRung(rung):
17       element2precondition[rung.root] = ctx.mk_true( )
18       TranslateRungRecursive(rung.root)
19
20
21   Procedure TranslateRungRecursive(element):
22       if element "is AND of two elements":
23           res = TranslateAnd(element)
24       if element "is OR of two elements":
25           res = TranslateOr(element)
```

```
26      if element "is XIC":
27          res = TranslateXIC(element)
28      if element "is XIO":
29          res = TranslateXIO(element)
30      if element "is EQU":          # similarly for LES, LEQ, GRT, GEQ, LIM
31          res = TranslateEQU(element)
32      if element "is ADD":          # similarly for MUL, DIV, SUB, NEG, ABS, MOD
33          res = TranslateADD(element)
34      if element "is OTE":
35          res = TranslateOTE(element)
36      if element "is OTL":
37          res = TranslateOTL(element)
38      if element "is OUT":
39          res = TranslateOTE(element)
40      return res
41
42
43   Procedure TranslateAnd(element)
44      pre = element2precondition[element]
45      for elem in "conjuncts in element":
46          element2precondition[elem] = pre
47          pre = ctx.mk_and(pre, TranslateRec(elem))
48      return pre
49
50
51   Procedure TranslateOr(element)
52      pre = element2precondition[element]
53      res = ctx.mk_false( )
54      for elem in "disjuncts in element":
55          element2precondition[elem] = pre
56          pre = ctx.mk_or(res, TranslateRec(elem))
57      return res
58
59
60   Procedure TranslateXIC(element)
61      if element "is not input":
62          element = var2current[element]
63      return element
64
65
66   Procedure TranslateXIO(element)
67      if element "is not input":
68          element = var2current[element]
69      return ctx.mk_not(element)
70
71
72   Procedure TranslateEQU(element)
73      lhs, rhs = element
74      if lhs "is not input":
75          lhs = var2current[lhs]
76      if rhs "is not input":
77          rhs = var2current[rhs]
78      return ctx.mk_eq(lhs, rhs)
79
80
81   Procedure TranslateADD(element)
82      addend1, addend2, result = element
83      if addend1 "is not input":
84          addend1 = var2current[addend1]
85      if addend2 "is not input":
86          addend2 = var2current[addend2]
87      var2current[result] = ctx.mk_ite(element2precondition[element],
88                                       ctx.mk_add(addend1, addend2),
89                                       result)
90      return element2precondition[element]
91
92
93   Procedure TranslateOTE(element)
94      var2current[element] = element2precondition[element]
95      return var2current[element]
96
97
98   Procedure TranslateOTL(element)
99      var2current[element] = ctx.mk_or(var2current[element], element2precondition[element])
100     return var2current[element]
101
102
```

```
103    Procedure TranslateOTU(element)
104        var2current[element] = ctx.mk__and(ctx.mk__not(element2precondition[element]),
105                                           var2current[element])
106        return var2current[element]
107
108
109    Procedure CreateLatch(element):
110        element2precondition[element] = ctx.mk__true( )
111        element2latch[element] = ctx.mk__latch(element)
112        var2current[element] = element2latch[element]
113
114
115    Procedure FinalizeLatch(element):
116        ctx.set__init__next(element2latch[element], ctx.mk__false( ), var2current[element])
```

The predefined model recursive procedures comprise an initialization procedure which uses three helper dictionaries, as illustrated in lines 1-3 of the aforementioned table, wherein:
  element2precondition, it maps each element on a ladder diagram (contacts, coils, functions) to the Boolean condition that it receives from the left. This is basically the condition under which the block gets executed;
  var2current, it stores intermediate assignments for the variables, local or outputs;
  element2latch, it maps ladder variables to Intrepid's latches.

An Intrepid context is also created that allows the creation of the translated elements, as in line 4.

The predefined model recursive procedures comprise a translation of a routine procedure which performs the translation of a routine. It takes as input the rungs of the ladder diagram in Rockwell's notation, and the sets of inputs, outputs, and local variables from the L5X file, as illustrated in lines 7-13 of the aforementioned table. Firstly, it creates a latch for each output and variable, lines 8-9. Then it calls procedure TranslateRung to translate each rung of the ladder diagram, lines 10-11. Finally, it finalizes the latches, lines 12-13.

The predefined model recursive procedures comprise a translation of a rung procedure which translates a rung in Rockwell's notation into the corresponding Intrepid model, as illustrated in lines 16-18 of the aforementioned table. The leftmost element of the rung, rung.root, has precondition "true", since it is directly attached to the left power rail, line 17. The translation is then handled by a call to procedure TranslateRungRecursive, line 18. Procedure TranslateRungRecursive, lines 21-40, dispatches the translation to helper functions (that may call TranslateRungRecursive again). Procedure TranslateAnd, lines 43-48, implements the translation of elements that are placed on the same connection and are therefore to be interpreted as a logical conjunction. The main loop, lines 45-47, iterates through the conjuncts, and it updates their preconditions (the precondition of an element "y" on the right of an element "x" will be influenced by the truth value of "x"). Similarly, TranslateOr, lines 51-57, takes care of translating elements that are attached with vertical connections, that are to be interpreted as logical disjunctions.

The first contact translating procedure TranslateXIC, illustrates in lines 60-63, and the second contact translating procedure TranslateXIO, illustrated in lines 66-69, take care of translating contacts. They simply return inputs (negate inputs respectively) or the currently stored symbolic value of a variable or output (negated value respectively).

Procedure TranslateEQU, lines 72-78, takes care of translating equality between two elements, each being either an input or the current stored symbolic value for variables and outputs. Similar functions can be implemented for LES, LEQ, GRT, GEQ, LIM with a minor modification of the instruction at line 78, by taking the right translation shown in previous sections. Because these functions return a Boolean value, they interfere with the preconditions of the elements that are on their right on a connection.

Procedure TranslateADD, lines 81-90, takes care of translating an addition between two elements, placing the result in a third. Notice the use of the mk_ite construct to decide the current value of the third variable: essentially the operation is executed only if the precondition for the block holds true, otherwise the value of the variable is left unchanged. Similar functions can be implemented for SUB, NEG, MUL, DIV, MOD, ABS with a minor modification of the instruction at line 90. The operation does not influence the precondition of the elements that are on its right on a connection.

The first coils translating procedure TranslateOTE, as in lines 93-95, the second coils translating procedure TranslateOTL, as in lines 98-100, and the third coils translating procedure TranslateOTU, as in lines 103-106, take care of translating the coils. TranslateOTE simply assigns the value received from the left connection, TranslateOTL sets the latch value to true if the left connection holds true, otherwise preserves the previous value, and TranslateOTU sets the latch value to false if the left connection holds false, otherwise preserves the previous value.

The invention claimed is:
1. A method for automatic translation of ladder logic to a Satisfiability Modulo Theories based model checker in a network comprising:
  defining (10) a topology of said network basing on packets exchanged in said network;
  extracting (20) a program from said packets relating to a PLC in said network and identifying inputs, outputs, variables and a ladder diagram of said PLC;
  translating (30) said inputs, outputs, variables and ladder diagram into a predefined formal model;
  wherein said predefined formal model is an SMT-based model checker defined by a circuit with a global clock that divides an execution into discrete time steps;
  and wherein said translating (30) comprises:
    translating the set of data types of said program according to a predefined model set of data types of said circuit-like SMT-based model checker;
    translating said inputs of said PLC as corresponding model inputs of said circuit-like SMT-based model checker;

translating said outputs of said PLC as corresponding model output latches of said SMT-based model checker;

translating said variables of said PLC as corresponding model variable latches of said SMT-based model checker;

translating comparators and arithmetic operators of said ladder diagram into a plurality of predefined model functions of said SMT-based model checker;

translating contacts and coils of said ladder diagram according to predefined model recursive procedures relating to said predefined model set of data types, said model inputs, said model output latches, said model variable latches and said plurality of predefined model functions, wherein said contacts are switches that can block or allow the flow of the current in a connection and each of said contacts is controlled by a Boolean input or variable, and wherein said coils are assignments to Boolean variables;

and wherein said SMT-based model checker defines a circuit with a global clock that divides the execution into discrete time steps;

wherein said SMT-based model checker comprises:

model inputs as basic signals of supported types that get a corresponding value at every time step;

model output latches and model variable latches as basic memory elements that can hold a value of a supported type;

Boolean gates;

predefined model functions as comparators and arithmetic operators;

constants as signal values of supported types that never change value at every of said time steps.

2. The method for automatic translation of ladder logic to a SMT-based model checker in a network according to claim 1, wherein said predefined model set of data types comprises the data types 1-bit Boolean, 8-bits signed integers, 16-bits signed integers, 32-bits signed integers, 64-bits signed integers, 8-bits unsigned integers, 16-bits unsigned integers, 32-bits unsigned integers, 64-bits unsigned integers, 32-bits single-precision floating point and 64-bits double-precision floating point.

3. The method for automatic translation of ladder logic to a SMT-based model checker in a network according to claim 2, wherein said program is a Rockwell L5X file format, wherein said set of data types of said program comprises the data types 1-bit Boolean, 8-bits signed integers, 16-bits signed integers, 32-bits signed integers, 64-bits signed integers, 8-bits unsigned integers, 16-bits unsigned integers, 32-bits unsigned integers, 64-bits unsigned integers, 32-bits single-precision floating point, 64-bits double-precision floating point and a variable-size array of 8-bits signed integers, and wherein said predefined model set of data types is matched with said corresponding set of data types by removing said data type of variable-size array of 8-bits signed integers.

4. The method for automatic translation of ladder logic to a SMT-based model checker in a network according to claim 3, wherein said set of data types of said program has the notation BOOL for said 1-bit Boolean, SINT for said 8-bits signed integers, INT for said 16-bits signed integers, DINT for said 32-bits signed integers, LINT for said 64-bits signed integers, USINT for said 8-bits unsigned integers, UINT for said 16-bits unsigned integers, UDINT for said 32-bits unsigned integers, ULINT for said 64-bits unsigned integers, REAL for said 32-bits single-precision floating point and LREAL for said 64-bits double-precision floating point, and wherein said predefined model set of data types is matched with said corresponding set of data types having the notation Boolean for said 1-bit Boolean, int8 for said 8-bits signed integers, int16 for said 16-bits signed integers, int32 for said 32-bits signed integers, int64 for said 64-bits signed integers, usint8 for said 8-bits unsigned integers, uint16 for said 16-bits unsigned integers, uint32 for said 32-bits unsigned integers, uint64 for said 64-bits unsigned integers, float32 for said 32-bits single-precision floating point and float64 for said 64-bits double-precision floating point.

5. The method for automatic translation of ladder logic to a SMT-based model checker in a network according to claim 1, wherein said predefined model functions comprise the functions Addition, Subtraction, Multiplication, Division, Modulo, Negate, Absolute value, Limit, Equal to, Less than, Greater than, Less than or equal to and Greater than or equal to.

6. The method for automatic translation of ladder logic to a SMT-based model checker in a network according to claim 5, wherein said program is a Rockwell L5X file format, wherein said comparators and arithmetic operators of said program have the notation ADD(a,b,c) for said Addition, SUB(a,b,c) for said Subtraction, MUL(a,b,c) for said Multiplication, DIV(a,b,c) for said Division, MOD(a,b,c) for said Modulo, NEG(a,b) for said Negate, ABS(a,b) for said Absolute value, LIM(−10,a,10) for said Limit, EQU(a,b) for said Equal to, LES(a,b) for said Less than, GRT(a,b) for said Greater than, LEQ(a,b) for said Less than or equal to and GEQ(a,b) for said Greater than or equal to, and wherein said predefined model functions are matched with said corresponding comparators and arithmetic operators following the construction c=ctx.mk_add(a, b) for said Addition, c=ctx.mk_sub(a, b) for said Subtraction, c=ctx.mk_mul(a, b) for said Multiplication, c=ctx.mk_div(a, b) for said Division, c=ctx.mk_mod(a, b) for said Modulo, b=ctx.mk_minus(a) for said Negate, b=ctx.mk_ite(ctx.mk_lt(a, ctx.mkNumber("0", it)), ctx.mk_minus(a), a) for said Absolute value, ctx.mk_and(ctx.mk_geq(a, ctx.mkNumber("−10", it)), ctx.mk_leq(a, ctx.mkNumber("10", it))) for said Limit, ctx.mk_eq(a, b) for said Equal to, ctx.mk_lt(a, b) for said Less than, ctx.mk_gt(a, b) for said Greater than, ctx.mk_leq(a, b) for said Less than or equal to and ctx.mk_geq(a, b) for said Greater than or equal to.

7. The method for automatic translation of ladder logic to a SMT-based model checker in a network according to claim 1, wherein said predefined model recursive procedures comprise a first contacts translating procedure and a second contacts translating procedure which allow to translate contacts and a first coils translating procedure, a second coils translating procedure and a third coils translating procedure which allow to translate coils, wherein said first contacts translating procedure returns said model input or the currently stored of said model output latch or model variable latch and said second contacts translating procedure returns the negate of said model input or the negate currently stored of said model output latch or model variable latch, and wherein said first coils translating procedure assigns the value received from the left connection, said second coils translating procedure sets the latch value to true if the left connection holds true, otherwise preserves the previous value and said third coils translating procedure sets the latch value to false if the left connection holds false, otherwise preserves the previous value.

8. The method for automatic translation of ladder logic to a SMT-based model checker in a network according to claim 7, wherein said program is a Rockwell L5X file format, wherein said contacts of said program comprise the notation XIC(x) to examine if said switch is closed, which propagates 1 only if the value on the left is 1 and x is 1, and XIO(x) to examine if said switch is open, which propagates 1 only if the value on the left is 1 and x is 0, wherein said first contacts translating procedure matches with said notation XIC(x) following the construction Procedure TranslateXIC(element)
if element "is not input":
element=var2current[element]
return element, wherein said second contacts translating procedure matches with said notation XIO(x) following the construction Procedure TranslateXIO(element)
if element "is not input":
element=var2current[element]
return ctx.mk_not(element), and wherein said coils of said program comprise the notation OTE(y) to energy output, which assigns 1 to y if the value on the left is 1 otherwise 0, OTL(y) to latch output, which assigns 1 to y if the value on the left is 1 otherwise leave unchanged, and OTU(y) to unlatch output, which assigns 0 to y if the value on the left is 1 otherwise leave unchanged, wherein said first coils translating procedure matches with said notation OTE(y) following the construction Procedure TranslateOTE(element)
var2current[element]=element2precondition[element]
return var2current[element]

wherein said second coils translating procedure matches with said notation OTL(y) following the construction Procedure TranslateOTL(element)
var2current[element]=ctx.mk_or(var2current[element], element2precondition[element])
return var2current[element], and wherein said third coils translating procedure matches with said notation OTU(y) following the construction Procedure TranslateOTU(element)
var2current[element]=ctx.mk_and(ctx.mk_not (element2precondition[element]), var2current[element])
return var2current[element].

9. The method for automatic translation of ladder logic to a SMT-based model checker in a network according to claim 1, wherein said SMT-based model checker defines a circuit with a global clock that divides the execution into discrete time steps.

10. The method for automatic translation of ladder logic to a SMT-based model checker in a network according to claim 9, wherein said SMT-based model checker comprises:

model inputs as basic signals of supported types that get a corresponding value at every time step;

model output latches and model variable latches as basic memory elements that can hold a value of a supported type;

Boolean gates;

predefined model functions as comparators and arithmetic operators;

constants as signal values of supported types that never change value at every of said time steps.

11. The method for automatic translation of ladder logic to a SMT-based model checker in a network according to claim 10, wherein said model output latches and model variable latches store an initial value and a next state function they hold when said circuit is booted at first time step.

12. The method for automatic translation of ladder logic to a SMT-based model checker in a network according to claim 11, wherein said model output latches and model variable latches are updated with a respective value at each subsequent time step by the value expressed by said next state function.

* * * * *